Nov. 1, 1949.   R. T. SWEENEY   2,486,618
DRIVE CHAIN
Filed April 9, 1946   2 Sheets-Sheet 1
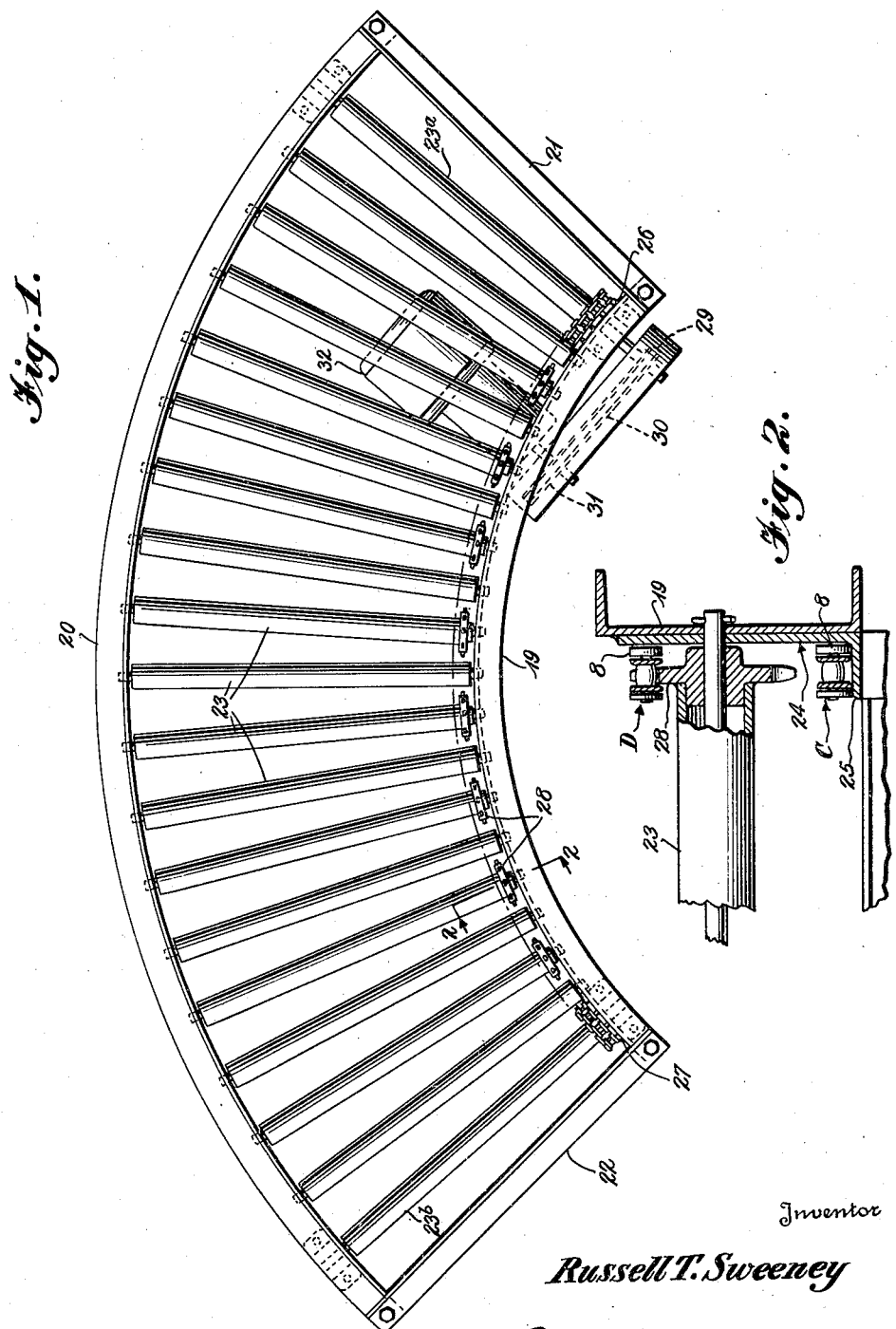
Inventor
*Russell T. Sweeney*
By *L. Donald Myers*
Attorney

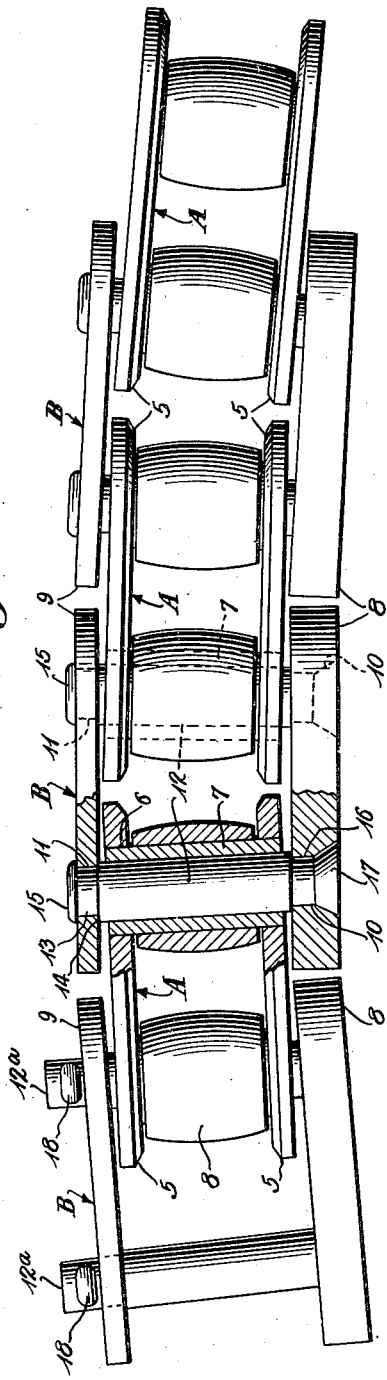
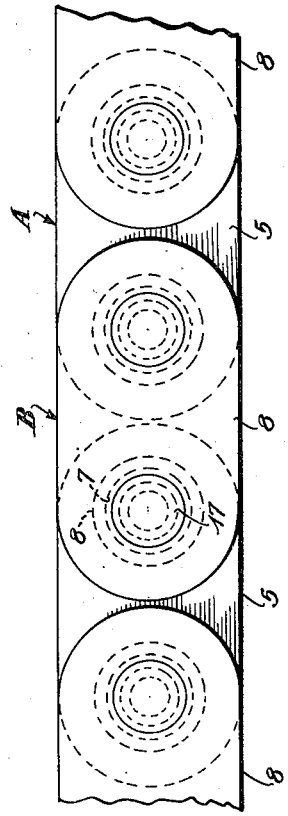

Patented Nov. 1, 1949

2,486,618

UNITED STATES PATENT OFFICE 2,486,618

DRIVE CHAIN

Russell T. Sweeney, Indianapolis, Ind., assignor to Link-Belt Company, a corporation of Illinois Application April 9, 1946, Serial No. 660,683

11 Claims. (Cl. 74—245)

This invention relates to new and useful improvements in drive chains.

It is the primary object of this invention to provide a drive chain that is adapted to travel a closed path which includes two laterally curved runs and that is adapted to wrap around terminal sprockets and drivingly engage the teeth of intermediate sprockets, all of which have their axis of rotation angularly arranged with respect to each other.

Another important object of the invention is to provide a drive chain of the above mentioned type in which the articulating joints between links are formed by chain pins and bushings that have continuous or full length bearings areas with the result that normal wear life is provided in the chain components.

A further object of the invention is to provide a drive chain of the inside and outside link type which will travel laterally curved paths between its terminal sprockets as a result of the pitch holes for the outside link side plates on opposite sides of the chain being of different pitch, or being spaced different distances.

Other objects and advantages of the invention will be apparent during the course of the following description.

In the accompanying drawings forming a part of this specification and in which like numerals are employed to designate like parts throughout the same, Figure 1 is a plan view of a 90° chain drive live roller curve incorporating a drive chain of the type embodying this invention, Figure 2 is a fragmentary sectional view taken on line 2—2 of Fig. 1, Figure 3 is a plan view, partly broken away, of a section of drive chain embodying this invention, and Figure 4 is a fragmentary side elevational view of the chain illustrated in Fig. 3.

In the drawings, wherein for the purpose of illustration is shown the preferred embodiment of this invention, and first particularly referring to Fig. 3, the reference character A designates in its entirety each one of the inside links of the chain while the reference character B designates in its entirety each one of the outside links of the chain.

Each inside link A includes two side plates 5. Each one of these side plates is provided with two pitch holes 6. The pitch holes for both side plates 5 of each inside link A are uniformly spaced, or are of the same pitch. The opposite side plates 5 of each inside link are interconnected and held in spaced parallelism by the bushings 7 which may be press fitted at their opposite ends in the pitch holes 6 of the side plates. If the drive chain is to be of the roller type, each bushing 7 has journaled thereon a roller 8. Preferably, these rollers are formed with convexed peripheries.

From the above description, it will be seen that each one of the inside links A is of conventional roller drive chain construction. Fig. 3 of the drawings, however, discloses adjacent inside links as being angularly arranged with respect to each other. That is to say, these inside links are not truly aligned, or are not positioned so as to provide a straight center line, when assembled in the chain.

The angular arrangement of adjacent inside links is brought about by the novel construction of the outside links. Each one of these outside links B consists of a relatively thick side plate 8 and a relatively thin side plate 9. The relative thicknesses of these two plates preferably is such that the thicker plates 8 are twice or double the thickness of the side plates 9. Also, it is preferred that the thicker side plates 8 be of relatively high hardness to provide extra or special wearing qualities for a reason which will be obvious as the description of the use of this chain is given.

Each one of the side plates 8 of the outside links is provided with a countersunk pitch hole 10 adjacent each end portion. Each one of the side plates 9 is provided with the two pitch holes 11. These pitch holes 10 and 11 are spaced on different or dissimilar centers. That is to say, the pitch of the pitch holes 10 is less than the pitch of the pitch holes 11. The axes of the pitch holes 10 and 11, also, are not right angularly arranged with respect to the side faces of their respective side plates. Consequently, the axes of the aligned pitch holes 10 and 11 of the two side plates 8 and 9 of each outside link form an acute angle when the outside links are assembled in a drive chain, as is clearly illustrated in Fig. 3.

Chain pins 12 are provided to complete the outside links. These chain pins are journaled in the bores of the bushings 7. One end portion of each chain pin 12 is reduced in diameter, as at 13, for positioning in a pitch hole 11 of a side plate 9. This reduced diameter provides a shoulder 14 for engaging the inner face of the side plate 9. The extremity of the chain pin is riveted, or peened over, at 15 to anchor the chain pin to the side plate 9. The riveting or peening of the pin extremity at 15 may be relied upon for firmly fastening the end of the chain pin to the side plate 9 or the reduced portion 13 of the chain pin may be press fitted in the pitch hole 11 to further firmly secure the chain pin to the outside link side plate 9.

The remaining end portion of each chain pin 12 is reduced in diameter at 16 to fit the truly cylindrical portion of the pitch hole 10 of a side plate 8. The extremity of this reduced portion 10 is then riveted at 17 to flushly fit the countersunk portion of the pitch hole 10.

The chain pins 12 and bushings 7, therefore, provide articulating joints between the overlapped ends of adjacent inside and outside links. By inspecting the cut-away illustration of Fig. 3, it will be seen that the intermediate portion of each chain pin 12 snugly fits the bore of its associated bushing 7 to provide a normal, continuous, full length bearing between the chain pin and the bushing. That is to say, the bushings and their associated chain pins are not intended to partake of any abnormal rocking or radial movement with respect to each other. The outside link side plates 8 and 9, additionally, are so positioned and anchored on the extremities of the chain pins that no abnormal or unnecessary lateral clearance is provided between the opposed faces of adjacent or overlapped inside link and outside link side plates.

To permit the chain to be cut for assembly and disassembly with respect to sprockets, the chain pins 12a are not riveted at 15 but are apertured to receive the cotter pins 18.

By inspecting the plan view of Fig. 3, it will be seen that this section of chain will travel a curved path while moving through a run. This curved path arrangement results from the forming of the pitch holes 10 with a shorter pitch than that of the pitch holes 11 and angularly arranging the chain pins 12 for each outside link A at an acute angle with respect to each other.

Figs. 1 and 2 illustrate one use for the type of chain described in detail in connection with Fig. 3. This particular use is to effect the drive of certain of the live rollers for a roller curve.

This live roller curve includes the inside curved frame rail 19 and the outside curved frame rail 20. End braces 21 and 22 are employed for connecting the extremities of these two frame rails. A desired number of live or freely rotatable rollers 23 are suitably supported at their opposite ends in the vertical webs of the rails 19 and 20.

Fig. 2 discloses an L-shaped plate 24 that is arranged inside of the frame rail 19. This plate 24 performs the dual function of providing the base flange portion 25 for supporting the return run C of the endless drive chain that is employed with this live roller curve, and of taking the wear that is applied thereto by the double thickness side plates 8 of the outside links B. It will be appreciated that these outside link side plates 8 bear against and slide over the adjacent surface of the plate 24 while moving through the curved paths defined by the lower run C and the upper run D of the endless drive chain.

The end rollers 23a and 23b are provided with terminal sprockets 26 and 27 for the drive chain. Alternate ones of the remaining rollers 23 are provided with intermediate sprockets 28. These intermediate sprockets are of less diameter than the terminal sprockets so that the teeth of the intermediate sprockets only mesh with the upper or driving run D of the chain.

To positively drive the terminal rollers 23a and 23b and the intermediate rollers 23 that are provided with intermediate sprockets 28, the terminal roller 23a is provided with a driven sprocket 29 over which is trained a chain, or the like. A driver sprocket 31, driven by the electric motor 32, is employed for driving the chain 30. It will be appreciated that a V-belt and pulley drive may be employed in place of the chain and sprocket drive 29—30—31, if desired.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A drive chain of the type described, comprising a plurality of links each having side plates formed with pitch holes, and chain pins passing through the pitch holes of adjacent links to form articulating joints, the pitch holes formed in the opposite side plates of certain of said links being of different pitch to cause the chain to travel laterally curved paths between terminal sprockets.

2. A drive chain of the type described, comprising a plurality of alternately arranged inside and outside links each having side plates formed with pitch holes, and chain pins passing through the pitch holes of adjacent links to form articulating joints, the pitch holes formed in the opposite side plates of the outside links being of different pitch to cause the chain to travel laterally curved paths between terminal sprockets.

3. A drive chain of the type described, comprising a plurality of alternately arranged inside and outside links, each inside link having two side plates formed with pitch holes of uniform pitch and bushings having their ends fastened in the pitch holes to connect the side plates, each outside link having two side plates formed with pitch holes of different pitch, and chain pins fastened at their ends in the pitch holes of the outside links and journaled in the bushings of the inside links for continuous, full link bearing relative thereto to form articulating joints between adjacent links, the aforementioned difference in pitch of the pitch holes in the side plates of the outside links causing the two chain pins for each outside link to be arranged at an angle with respect to each other, whereby the chain will travel a laterally curved path in each run between terminal sprockets.

4. A drive chain of the type described, comprising a plurality of alternately arranged inside and outside links, each inside link having two side plates formed with pitch holes of uniform pitch, and bushings having their ends fastened in the pitch holes to connect the side plates, each outside link having two side plates, one of which is of substantially greater thickness than the other, with two pitch holes formed in each side plate, the pitch holes formed in the thinner side plate of each outside link being of longer pitch than the pitch holes formed in the remaining side plate of that link, and chain pins fastened at their ends in the pitch holes of the outside links and journaled in the bushings of the inside links for continuous, full length bearing relative thereto to form articulating joints between adjacent links, the aforementioned difference in pitch of the pitch holes in the side plates of the outside links causing the two chain pins for each outside link to be arranged at an angle with respect to each other, whereby the chain will travel a laterally curved path in each run between terminal sprockets.

5. A drive chain of the type described, comprising a plurality of alternately arranged inside and outside links, each inside link having two side plates formed with pitch holes of uniform pitch, bushings having their ends fastened in the pitch holes to connect the side plates and rollers journaled on the bushings, each outside link having two side plates formed with pitch holes of different pitch, and chain pins fastened at their ends in the pitch holes of the outside links and journaled in the bushings of the inside links for continuous, full length bearing relative thereto to form articulating joints between the adjacent links, the difference in pitch of the pitch holes in the side plates of the outside links causing the chain to travel laterally curved paths between terminal sprockets.

6. A drive chain of the type described, comprising a plurality of alternately arranged inside and outside links, each inside link having two side plates formed with pitch holes of uniform pitch and bushings having their ends fastened in the pitch holes to connect the side plates, each outside link having two side plates, one of which is of substantially greater thickness than the other, with two pitch holes formed in each side plate, the pitch holes formed in the thicker side plate of each outside link being countersunk at one end and of shorter pitch than the pitch holes formed in the thinner side plate of that link, and chain pins journaled in the bushings of the inside links and positioned at the ends in the pitch holes of the outside links with the ends of the chain pins positioned in the pitch holes of the thicker side plates being riveted flush in said countersunk ends.

7. A drive chain of the type described, comprising a plurality of alternately arranged inside and outside links, and chain pins, forming a part of the outside links, connecting said inside and outside links to form articulating joints, one chain pin of each outside link being arranged at an acute angle with respect to the other chain pin of that link to cause the chain to travel laterally curved paths between terminal sprockets.

8. In combination, a pair of terminal sprockets and at least one intermediate sprocket having their axes of rotation so angularly arranged with respect to each other as to intersect at a common point, whereby the sprockets will collectively define an arcuate path along a circle having its center at the said common point of intersection, and an endless drive chain supported by said sprockets for drivingly engaging the teeth of the intermediate sprocket and one of the terminal sprockets, said endless drive chain comprising a plurality of alternately arranged inside and outside links, the chain pins, forming a part of the outside links, connecting said inside and outside links to form articulating joints, the chain pins of each outside link being arranged at an acute angle with respect to each other, whereby the chain will inherently travel a laterally arcuate path coincident with the arcuate path defined by said sprockets in each run between terminal sprockets.

9. In combination, a pair of terminal sprockets and at least one intermediate sprocket having their axes of rotation so angularly arranged with respect to each other as to intersect at a common point, whereby the sprockets will collectively define an arcuate path along a circle having its center at the said common point of intersection, and an endless drive chain supported by said sprockets for drivingly engaging the teeth of the intermediate sprocket and one of the terminal sprockets, said endless drive chain comprising a plurality of alternately arranged inside and outside links each having side plates formed with pitch holes, and chain pins, forming a part of said outside links, passing through the pitch holes of adjacent links to form articulating joints, the pitch holes formed in the opposite side plates of the outside links being of different pitch to cause the chain to inherently travel a laterally arcuate path coincident with the arcuate path defined by said sprockets in each run between terminal sprockets.

10. In combination, a pair of terminal sprockets and at least one intermediate sprocket having their axes of rotation so angularly arranged with respect to each other as to intersect at a common point, whereby the sprockets will collectively define an arcuate path along a circle having its center at the said common point of intersection, and an endless drive chain supported by said sprockets for drivingly engaging the teeth of the intermediate sprocket and one of the terminal sprockets, said endless drive chain comprising a plurality of alternately arranged inside and outside links, each inside link having two side plates formed with pitch holes of uniform pitch, bushings having their ends fastened in the pitch holes to connect the side plates and rollers journaled on the bushings, each outside link having two side plates formed with pitch holes of different pitch, and chain pins fastened at their ends in the pitch holes of the outside links and journaled in the bushings of the inside links for continuous, full length bearing relative thereto to form articulating joints between the adjacent links, the difference in pitch of the pitch holes in the side plates of the outside links causing the chain to inherently travel laterally arcuate paths coincident with the arcuate path defined by said sprockets in each run between terminal sprockets.

11. In combination, a pair of terminal sprockets and at least one intermediate sprocket having their axes of rotation so angularly arranged with respect to each other as to intersect at a common point, whereby the sprockets will collectively define an arcuate path along a circle having its center at the said common point of intersection, and an endless drive chain supported by said sprockets for drivingly engaging the teeth of the intermediate sprocket and one of the terminal sprockets, said endless drive chain comprising a plurality of alternately arranged inside and outside links, each inside link having two side plates formed with pitch holes of uniform pitch, bushings having their ends fastened in the pitch holes to connect the side plates and rollers journaled on the bushings, each outside link having two side plates, one of which is of substantially greater thickness than the other, with two pitch holes formed in each side plate, the pitch holes formed in the thinner side plate of each outside link being of longer pitch than the pitch holes formed in the remaining side plate of that link, and chain pins fastened at their ends in the pitch holes of the outside links and journaled in the bushings of the inside links for continuous, full length bearing relative thereto to form articulating joints between adjacent links, the aforementioned difference in pitch of the pitch holes in the side plates of the outside links causing the two chain pins for each outside link to be arranged at an acute angle with respect to each other, whereby the chain will inherently travel a laterally arcuate path, coincident with the arcuate path defined by said sprockets in each run between terminal sprockets.

RUSSELL T. SWEENEY.

REFERENCES CITED

The following references are of record in the file of this patent:

UNITED STATES PATENTS

| Number | Name | Date |
| --- | --- | --- |
| 306,150 | Harker | Oct. 7, 1884 |
| 1,996,586 | Meyer | Apr. 2, 1935 |
| 2,293,029 | Focke | Aug. 18, 1942 |

FOREIGN PATENTS

| Number | Country | Date |
| --- | --- | --- |
| 9,544 | Great Britain | 1899 |